July 1, 1969

J. R. DALE 3,452,594

FLUID FLOW VELOCITY SENSOR

Filed May 29, 1967

INVENTOR.
JOHN R. DALE

BY

ATTORNEYS

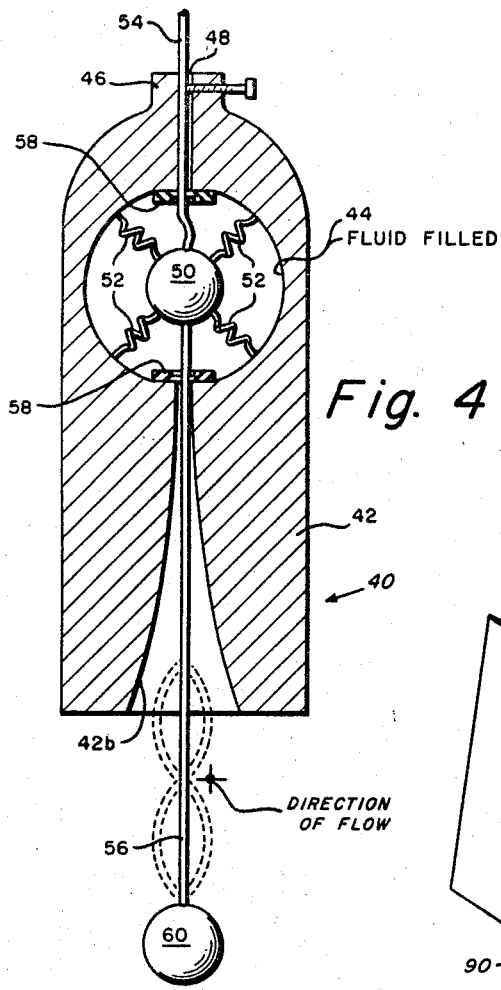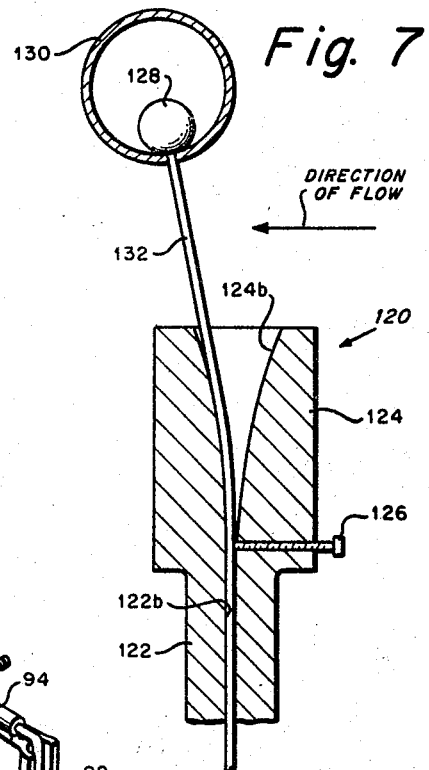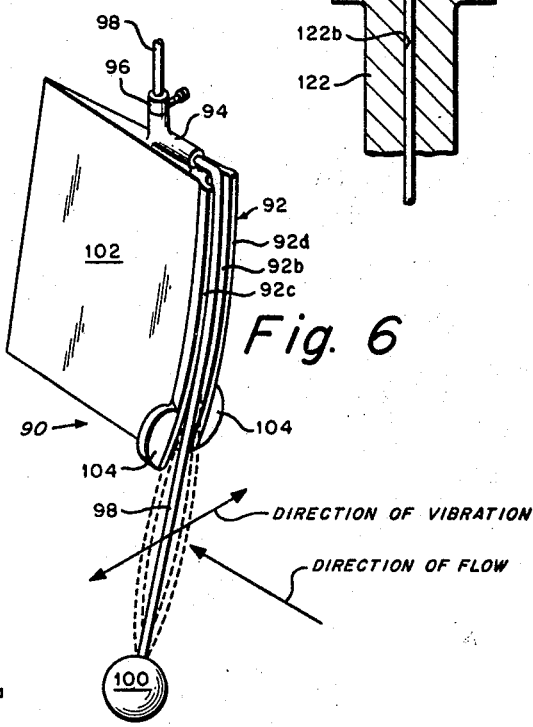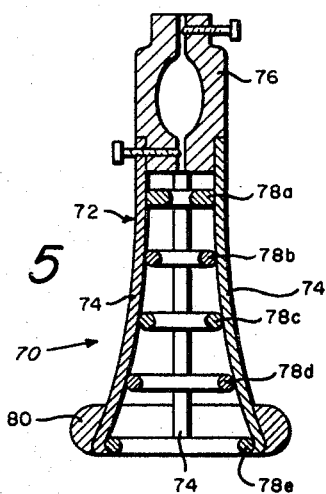

United States Patent Office 3,452,594
Patented July 1, 1969

3,452,594
FLUID FLOW VELOCITY SENSOR
John R. Dale, Willow Grove, Pa., assignor to the United States of America as represented by the Secretary of the Navy
Filed May 29, 1967, Ser. No. 643,310
Int. Cl. G01f 1/00
U.S. Cl. 73—194
19 Claims

ABSTRACT OF THE DISCLOSURE

Apparatus for sensing the velocity of a fluid flow. The apparatus includes a member having one or more vibration node-fixing surfaces to which member is connected one end of a flexible cable immersible in a fluid flow of interest and having a drag inducing element connected to its free end for subjecting the cable to tension. The cable is deflected into engagement with one of the vibration node-fixing surfaces by the action of the moving fluid against the drag element. The apparatus further includes a hydrophone which, in effect, senses the frequency of transverse cable vibration excited by the fluid flow. In some of the embodiments disclosed, the external surface of the hydrophone functions as the drag inducing element.

Statement of Government interest

The invention described herein may be manufactured and used by or for the Government of the United States of America for governmental purposes without the payment of any royalties thereon or therefor.

Background of invention

Many known fluid flow velocity sensors introduce error in flow velocity measurements by reason of their inherent measurement of the intensity of a specific characteristic which is related to flow velocity. Other known sensors characteristically include a combination of movable elements which are subject to mechanical failure. Still other sensors require a power supply for satisfactory operation. Yet other sensors are fragile or are of a construction not well adapted for measuring the flow velocity of bodies of water at various selected depths.

Summary of invention

It is a general purpose of this invention to provide a fluid flow velocity sensor having a simple, more rugged construction and fewer movable parts than do devices heretofore known, which sensing device is capable of measuring very low fluid flow velocities with great accuracy. It is an object of this invention to provide a flow velocity sensor which overcomes the deficiencies of sensors heretofore known. It is a further object of this invention to provide a flow velocity sensor which utilizes a tensioned cable which is vibratory in response to the fluid flow for obtaining a signal indicative of the flow velocity and wherein discontinuities in the frequency of vibration of the cable over a range of flow velocities is avoided.

Briefly, the general purpose, the above stated objects, and other objects which will become apparent from this specification and the accompanying drawing are accomplished by providing a tensioned, flexible cable arranged for transverse vibration in response to excitation by the fluid flow of interest and connected at one end to a member having a vibration node-fixing surface which functions to change the effective length of the free end of the cable over a predetermined range of fluid flow velocities, means being included for providing an output signal indicative of the frequency of vibration of the cable.

Brief description of drawings

FIG. 4 represents a cross-sectional view in elevation of a modified embodiment taken along the direction of a fluid flow of interest;

FIG. 5 represents a cross-sectional view in elevation of a portion of a further modified embodiment;

FIG. 6 represents a pictorial view of a still further modified embodiment; and

FIG. 7 represents a cross-sectional view in elevation of yet another modified embodiment taken in a direction perpendicular to the direction of a fluid flow of interest.

Figure 1:
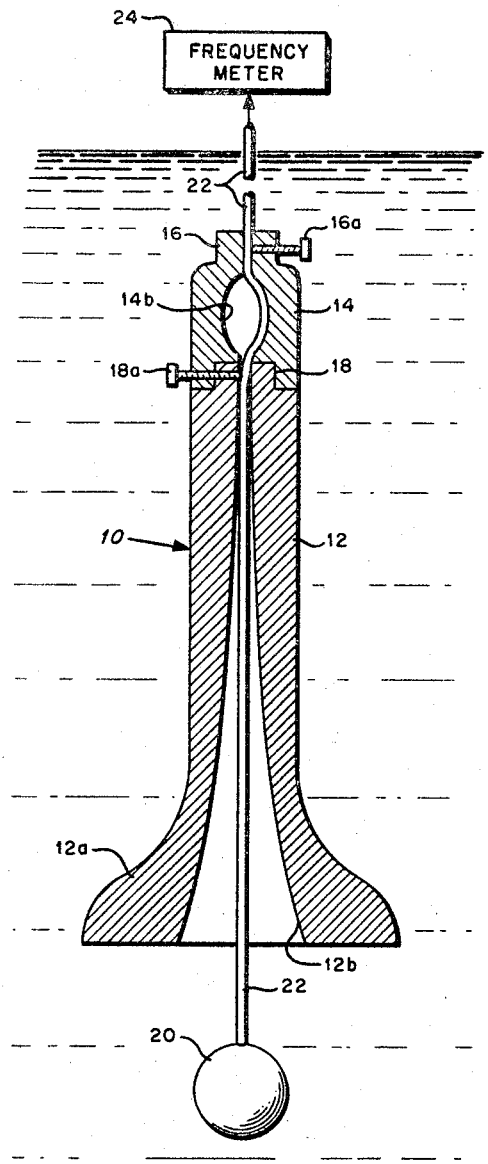
FIG. 1 represents a cross-sectional view in elevation of an embodiment of the invention.

Description of embodiments of FIG. 1

Referring now to FIG. 1, a vertically arranged fluid flow velocity sensor, which is generally designated 10 and is shown as having been lowered to a selected depth in a body of water, includes an elongated, trumpet-like, vibration node-fixing member 12 which terminates at one end in a bell portion 12a and is fixed at its other end to a connecting member 14 of generally a circular cross-section. The member 12 further includes extending therethrough along its longitudinal axis a bore 12b of circular cross-section which progressively varies in diameter and which has its largest diameter at the end adjacent the bell portion 12a and its smallest diameter at the other end adjacent the connecting member 14. The member 14 also has a coaxially aligned, longitudinal bore 14a extending therethrough which communicates with the bore 12b of member 12. The inner portion of the bore 14a is of somewhat larger diameter than the end portions thereof. The ends of the member 14 adjacent respective ends of the bore 14a terminate in a pair of cable connectors 16 and 18 which are fixed thereto and are schematically shown as having set screws 16a and 18a. A hydrophone 20 of a generally spherical external configuration is mechanically affixed to the free end of an insulated signal cable 22 of circular cross-section which is threaded through the bore 12b of the member 12 from the bell portion end and is threaded through the connectors 16 and 18 and the bore 14a of the member 14. The cable 22 functions to mechanically support the sensor 10 at the selected depth and in the fluid flow of interest. Further, the cable 22 is connected electrically between the piezoelectric transducer portion of the hydrophone 20 and a frequency meter 24 capable of measuring low frequencies.

The member 14 functions to isolate the hydrophone 20 from small, periodic changes in tension in the cable 22 attributable to vibration induced by fluid flow forces acting on the portion of the cable 22 extending between the sensor 10 and the frequency meter 24. The somewhat wider inner portion of the bore 14a of the member 14 is of a size to permit a slight curving of the cable 22 therewithin. The cable securing screw 16a of the connector 16 clamps the cable 22 so that the mechanical support of the sensor 10 is effected through the upper portion of the cable 22, the connector 16 and the member 14. The screw 18a of the connector 18 is adjusted to firmly secure the depending portion of the cable 22 thereto. Thereby, the hydrophone 20 is supported by the member 14 through the free end of the cable 22 which, in turn, is secured to and extends from the cable connector 18 through the bore 12b of member 12.

It is contemplated that the sensor 10 could be affixed to the end of a substantially rigid pole in order that it may be oriented so that its longitudinal axis is vertically arranged. The use of such a pole becomes unfeasible when the sensor 10 is to be submerged at large depths. Hence, the bell portion 12a of the member 12 has been included and has a sufficient weight per se to lower the center of gravity of the sensor 10 to a point at which the righting moment of the sensor 10 greatly exceeds the anticipated tilting moments attributable to the drag forces generated on the members 14 and 12 within the anticipated predetermined range of flow velocities for which the sensor 10 has been designed. The external configuration of the sensor 10 may be modified in accordance with aerodynamic principles to assure that a substantially vertical orientation of the sensor 10 is maintained at flow velocities within the designed range.

*Description of operation*

Generally, as above indicated, the operation of the invention contemplates that the sensor 10 be so positioned that its longitudinal axis is vertically arranged. The portion of the cable 22 from which the hydrophone 20 depends is immersed in the fluid flow and is thereby caused to vibrate transversely of the direction of the flow with a frequency related to the magnitude of the flow. The inner surface of the bore 12b of the member 12 comprises a continuous plurality of vibration node-fixing points. Thus, the fluid flow acts primarily upon the external surface of the hydrophone 20 and generates a drag force which, in turn, causes the portion of the cable 22 which supports the hydrophone 20 to be deflected into touching engagement with a portion of the surface of the bore 12b. The portion of the cable 22 extending between the hydrophone 20 and the closest point of touching engagement of the cable 22 by the surface of the bore 12b, the length thereof being hereinafter referred to as the effective length of the cable 22, will vibrate, if properly excited, with a frequency postulated to be defined generally by the equations for the vibration of a string fixed at its ends. The enhanced cable vibration enables the use of a hydrophone which, in turn, can provide an output signal having a greater level than heretofore achievable. The hydrophone 20 senses the small changes in tension along the cable 22 which changes have a frequency equal to the frequency of vibration of the cable. Accordingly, the hydrophone 20 provides an output signal to the frequency meter 24 which, in turn, provides a visual indication of the cable vibration frequency which can be correlated to the magnitude of the flow velocity.

Since the bore 12b has a circular cross-section at all points along its axis, the sensor 10 is capable of operation no matter what the geographical reference direction of the fluid flow may be.

While the use of a hydrophone for sensing cable vibration is preferred, it is contemplated that accelerometers or other devices could be used which are capable of providing a signal having a frequency equivalent to that of the cable vibration.

Figure 2:
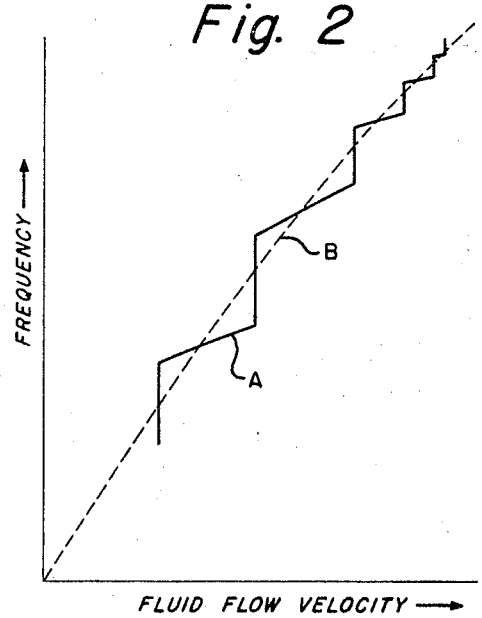
FIG. 2 represents a diagram of frequency-fluid flow velocity curves.

Referring now to the frequency-fluid flow velocity diagram of FIG. 2, a step-like curve A represents an experimentally ascertained frequency-flow velocity curve characteristic of a suspended cable weighted at its free end and immersed in water. The indicated frequencies of vibration of the cable are each attributable to the action of the water as it flows around the cable at a corresponding flow velocity. Sudden increases in frequency appear to occur generally at those flow velocities wherein the mode of cable vibration switches from that wherein one number of standing waves along the cable is present to that wherein the next successive number of standing waves is present. Curve B of FIG. 2 represents an ideal frequency-fluid flow velocity characteristic for the tensioned flexible cable of the apparatus of the invention. The discontinuities in the curve A over a predetermined range of flow velocities have been avoided in curve B by reason that the effective lengths of the cable for successive predetermined degrees of deflections of the cable 22 caused by the corresponding successively increased amounts of drag force generated on the hydrophone 20 are correspondingly decreased by touching engagement with successive portions of the surface of the bore 12b. Additionally, the frequency of vibration of the cable 22 in response to the flow field of the particular velocity for causing a particular degree of deflection may be made equal to the frequency of vibration for a cable having vibration nodes at its effective ends by selecting the particular effective length and accordingly positioning the surface of the bore 12b.

Figure 3:
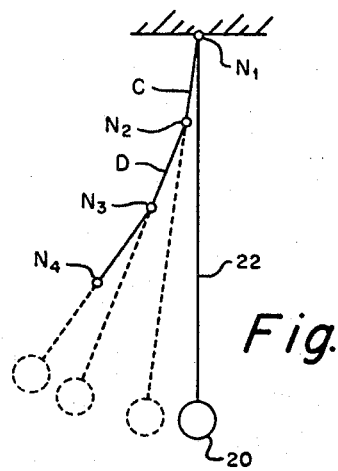
FIG. 3 represents a diagram explanatory of the generation of a node-fixing surface for apparatus according to the invention.

The diagram of FIG. 3 further enables a better understanding of how the surface of the bore 12b may be shaped in accordance with a postulated theory of operation of the invention. The frequency of vibration of a cylindrical object is positioned transversely of a fluid flow in response to periodic flow forces may be defined by the equation:

$$f = S_t U_o / d \qquad (1)$$

wherein $S_t$ represents the Strouhal number, $U_o$ represents the fluid flow velocity and $d$ represents the diameter of the object.

It is to be noted that when the Reynolds number is decreased to values of about 50 by reason of lowering the fluid flow velocities, the forces exerted on an object are no longer periodic and the Equation 1 no longer holds true. The diameter $d$ of the cable 22 can be increased so that the Reynolds number will be increased. Consequently, the forces applied to the cable 22 will again be periodic and Equation 1 will describe the frequency of vibration.

The frequency of vibration of a string or cable which is relatively fixed at its ends may be expressed by the equation:

$$f = n\sqrt{T/m_c}/2L \qquad (2)$$

wherein $n$ is any integer ($n=1$ corresponds to the fundamental, and $n=2, 3 \ldots$ correspond to successive harmonics or overtones), L is the effective length of the cable extending between the relatively fixed points. T is the tensional force being exerted on the cable, and $m_c$ is the mass per unit length of the cable.

It therefore appears that if the fluid flow induces a frequency of vibration substantially in accordance with Equation 1 the cable 22 can be excited into vibration in accordance with Equation 2 if the values for L, T and $m_c$ are appropriately chosen. Hence, small forces generated by the fluid flow on the cable 22 can be utilized to stimulate vibrations of large amplitude. Hence, the hydrophone can provide an output signal which can be fed to actuate the frequency meter 24 and thereby give an indication of the magnitude of the flow velocity.

It appears that the tension T in the cable 22 will approximate the resultant of the weight of the hydrophone 20 and the drag force generated on the hydrophone 20 by the fluid flow. This relationship can be expressed by the equation:

$$T = \sqrt{(w_m)^2 + (C_D S \rho U_o^2/2)^2} \qquad (3)$$

wherein $w_m$ is equal to the weight of the hydrophone 20 in the fluid within which it is to be immersed, $C_D$ is equal to the drag coefficient for the external configuration of the hydrophone, S is equal to the cross-sectional area of the external configuration of the hydrophone orthogonal to the direction of the fluid flow, $\rho$ is equal to the mass density of the fluid, and $U_o$ is equal to the flow velocity.

By substituting Equation 3 for T in Equation 2 and by setting Equation 1 equal to Equation 2 as modified, the following equation for a desired effective length L of the cable can be derived:

$$L = nd^4 \sqrt{(w_m)^2 + (C_D S \rho/2)^2 U_o^4} / 2S_t U_o (m_c)^{1/2} \qquad (4)$$

Example

The following example may be helpful in designing the surface of the bore 12b of node-fixing member 12. Suppose that a typical configuration includes a cable 22 having a diameter $d$ of 0.003 feet and a mass per unit length of 0.00005 lb. sec.$^2$/ft.$^2$, and includes a hydrophone of spherical external configuration having a weight $w_m$ in the fluid of 0.01 lb., a drag coefficient $C_D$ of 0.8 and a diameter of 0.08 ft. The cross-sectional area S therefore equals $\pi/4$ times $(0.08)^2$. Suppose that the apparatus is to be operated under conditions wherein the Strouhal number $S_t$ equals 0.2. The effective length in feet of the cable 22 desirable for vibration at the fundamental frequency defined by Equation 1 may therefore be expressed as a function of the flow velocity $U_o$:

$$L = 0.106\sqrt[4]{1.000 + 0.152\ U_o^4}/U_o \qquad (5)$$

From FIG. 2, it can be surmised that the angle of deviation $\theta$ of the cable 22 of the example from vertical will have a tangent substantially equal to the quotient of the drag force generated on the hydrophone 20 of the example divided by the weight of the hydrophone as shown by the following equation:

$$\tan \theta = C_D S \rho U_o^2 / w_m = 0.390 U_o^2 \qquad (6)$$

From Equations 5 and 6, the values for L and $\theta$ over a selected flow velocity range as appear in Table 1 below may be obtained:

TABLE 1

| $U_o$ in ft./sec. | L in ft. | $\theta$ |
|---|---|---|
| 1.00 | 0.110 | 21°18' |
| 0.90 | 0.121 | 17°32' |
| 0.80 | 0.135 | 13°48' |
| 0.70 | 0.154 | 10°50' |
| 0.60 | 0.178 | 8°0' |
| 0.50 | 0.212 | 5°34' |
| 0.40 | 0.265 | 3°34' |
| 0.30 | 0.354 | 2°1' |
| 0.25 | 0.424 | 1°24' |
| 0.20 | 0.530 | 0°54' |
| 0.15 | 0.707 | 0°30' |
| 0.10 | 1.060 | 0°13' |

Table 1 indicates that for the apparatus of the example the angles of deflection for the flow velocity range of 0.10 to 0.25 feet per second are quite small. Hence, it is preferred that node-fixing surfaces for various portions of the range be designed for inclusion in respective sensors 10. For example, if the product of the drag coefficient $C_D$ and the cross-sectional surface area S of the drag element such as the hydrophone 20 were to be increased by a factor of 10, it appears from Equation 6 that the angle of deflection $\theta$ at a flow velocity of 0.1 feet per second would be 2°14' rather than a deflection of only 0°13'. Correspondingly, the angle of deflection of the cable from vertical for flow velocity of 0.25 feet per second would be 13°43' instead of 1°24'. The desired effective length L for the configuration of the example as modified at a flow velocity of 0.25 feet per second would be increased slightly to 0.431 feet, while the desired effective length L for a flow velocity of 0.10 feet would not be significantly changed from the value in Table 1.

Refering now to FIG. 3, let it be assumed that the node-fixing surface of the bore 12b for the apparatus of FIG. 1 including a cable and hydrophone having the characteristics described above were to be designed for a range of flow velocities from 0.3 feet per second to 1.0 feet per second. From Table 1 it appears that the desired effective length L for a cable which would vibrate in accordance with the Equation 2 at a flow velocity of 0.3 feet per second is 0.354 feet. Consequently, the length of the portion of the cable 22 extending between the hydrophone 20 and the node-fixing point $N_1$ at the connector 18 would be fixed at 0.354 feet. From Table 1, at the next increased increment of flow velocity of 0.4 feet per second, the cable 22 will be deflected from the vertical 3°34' and the cable should have its effective length decreased to 0.265 feet by reason of touching engagement thereof with the surface of the bore 12b. Consequently, if the surface of the bore 12b were to extend from the connector 18 at a deflection of 3°34' from the longitudinal axis of the member 12 for a distance C equal to 0.089 feet to the node-fixing point $N_2$, the cable 22, after undergoing the appropriate deflection, will lie along the increment of surface C of FIG. 3; and the length of the cable 22 extending beyond the surface of the bore 12b will have the desired effective length. From Table 1 it appears that at a flow velocity of 0.5 feet per second the cable should have been deflected 5°34'. Starting at node-fixing point $N_2$, the surface of the bore 12b extends outwardly at a deflection of 5°34' from vertical for a distance D equal to 0.053 feet to a node-fixing point $N_3$. The sum of the segments C and D when substracted from the initial length of 0.354 feet is equal to 0.212 feet at which effective length the enhanced vibration in accordance with Equation 2 will occur. In a similar manner the node-fixing point $N_4$ may be chosen.

Of course, it is contemplated that the relative locations of the node-fixing points $N_1$, $N_2$, etc. can be found by experimentation. Further, it has been discovered by experimentation that the beneficial effects of vibration substantially in accordance with the Equation 2 begin to be noticeable if the effective length of the cable is adjusted to within about 9 percent of the desired effective length. The surface 12b can be further shaped to compensate for slight anticipated tilting of the sensor 10 over the design range of flow velocities.

Description of embodiments of FIGS. 4–7

Referring now to FIG. 4, the sensor 40 shown therein includes a vibration node-fixing member 42 having extending upwardly thereinto from one end thereof a longitudinal bore 42b of circular cross-section whose surface has a shape designed in accordance with the above example. The bore 42b terminates at a spherical cavity 44 coaxially positioned within the member 42. A connecting member 46 similar to the member 14 of the sensor 10 of FIG. 1 is fixed to the other end of the member 42, and a bore 48 extends through the member 46 and into the member 42 to the cavity 44. A hydrophone 50 is positioned within the chamber 44 and is mounted on springs 52. A signal cable 54 is threaded through the bore 48 and is secured to the connecting member 46 to provide mechanical support for the sensor 40. The cable 54 further is connected electrically between the hydrophone 50 and a frequency meter, not shown. The hydrophone 50 further has connected thereto a flexible cable 56 which depends therefrom and extends through a diaphragm 58 fixed adjacent the cavity end of the bore 42b and extends through the bore 42b. A drag inducing weight 60 is connected to the free end of the cable 56. The diaphragm 58 forms a closure whereby damping oil may be contained within the cavity 44. The effective length of the cable 56 has been chosen in accordance with Equation 4 where $n$ is 2 so that the cable will normally vibrate in response to the selected range of flow velocities at frequencies which are second harmonics. As shown in FIG. 4, two standing waves in the cable 56 will appear upon excitation thereof by a flow velocity within the desired range. The cable-engaging portion of the diaphragm 58 functions as the first node-fixing points from which the successive points of the surface of the bore 42b may be generated in accordance with the selected range. Sensor 40 has an advantage in that a greater portion of one complete standing wave may be subjected to excitation by the fluid flow. Thereby, output signals of a higher level may be obtained from the hydrophone 50.

Referring now to FIG. 5, a modified sensor 70 has a vibration node-fixing member 72 which includes four outwardly diverging support rods 74 spaced 90° apart each having an end fixed to a connecting member 76 which is similar to the member 14 of the sensor 10 of FIG. 1. A plurality of rings 78a–78e, inclusive, having inner diameters of progressively increased lengths are coaxially mounted within and fixed to the diverging support rods 74. The inner surfaces of these rings function as node-fixing points, and their respective relative diameters and positions along the longitudinal axis of the sensor 70 may be determined in the same manner as described above in connection with the node-fixing points for the surface of the bore 12b of sensor 10. An annular toroidal weight 80 is fixed to the other ends of the rods 74 of the member 72, and its function is to maintain the sensor 70 in a substantially vertical orientation during subjection to flow velocities within the designed range. This embodiment has the advantage that the entire length of the tensioned, flexible cable (not shown) with which the member 72 is used, is subjected to the periodic forces produced thereon by the fluid flow.

Referring now to FIG. 6, the sensor 90 includes a vibration node-fixing member 92 of trough-like configuration whose node-fixing surface 92b may be determined in accordance with the example given for the shape of the surface 12b of FIG. 1. The vibration node-fixing member 92 is fixed to a cable sleeve 94 which, in turn, is swivelly connected to a connector 96 similar to the member 14 of the sensor 10. A cable 98 extends through the connector 96 and the sleeve 94 and thereby is positioned to extend adjacent the node-fixing surrface 92b of the member 92. As in the case of sensor 10, a hydrophone 100 is connected to the free end of the cable 98 which has a designed effective length L sufficient, as shown, for the generation of a single standing wave. The node-fixing surface 92b of member terminates laterally at guard walls 92c and 92d whose function is to guide the flow deflected cable 98 against the surface 92b. A vane member 102 is fixed to and extends from the obverse surface of the member 92, and it functions to rotatably orient the node-fixing surface 92b directly into the path of the fluid flow so that the cable 98 always will be deflected by the flow into touching engagement with a portion of the node-fixing surface 92b. A weight 104 is fixed to the lower portion of the vane 102 and the extended end of the member 92 and functions to maintain the vertical orientation of the sensor 90 within the designed range of fluid flow velocities. In this embodiment, the entire length of the standing wave may be excited by the fluid flow.

Referring now to FIG. 7, a sensor generally designated at 120 is mounted on the end of a post 122 which protrudes upwardly into the fluid flow and is rigidly positioned with respect thereto. The post 122 includes a longitudinally extending bore 122b. The sensor 120 includes a node-fixing member 124 secured to the post 122 and having a vertically arranged bore 124b extending therethrough coaxially of the bore 122b. The bore 124b has a node-fixing surface which is shaped in a similar manner as the surface of the bore 12b of the member 12 of FIG. 1. The member 124 also has a cable securing screw 126 which adjustably extends transversely of and toward the bore 124b. A hydrophone 128 is fixed within a hollow, fluid tight sphere 130 to the inner surface thereof. A flexible signal cable 132 is connected to and extends from the hydrophone 128 and through the wall of the sphere 130 and is threaded through the bores 124b and 122b of the member 124 and the post 122. The cable 132 is electrically connected between the hydrophone 128 and a frequency meter, not shown, and is secured from withdrawal from the bore 124b by the screw 126. The sphere 130 functions as a float which subjects the cable 132 to tension. The operation of the apparatus 120 is exactly the same as the operation of the other embodiment except that the tension force applied to the cable 132 is exerted by reason of the resultant of the drag force thereon and the buoyancy, rather than the weight, of the hydrophone-containing sphere 130.

From the above descriptions, it is apparent that the invention provides improved fluid flow velocity sensors which function to provide an accurate indication of the magnitude of the velocity of the fluid flow of interest. By progressively decreasing the effective length of flexible cable as the degree of cable deflection is increased by increasing flow velocities, the sensors assure that the mode of cable vibration will not suddenly switch to a harmonic thereof within the design range of flow velocities. Additionally, the vibration of the cable in response to fluid flow is enhanced by reason that the sensors properly adjust the effective length of the cable as described. It is contemplated that sensors according to the invention could be used in combination with flow direction signalling devices so that indications both of the magnitude and direction of the flow velocity may be obtained.

It should be understood, of course, that the foregoing disclosure relates only to preferred embodiments of the invention and that numerous modifications or alterations may be made without departing from the spirit and scope of the invention as set forth in the appended claims.

I claim:
1. Flow velocity measuring apparatus comprising:
support means formed for immersion in a fluid in a predetermined orientation over a range of flow velocities;
an elongated flexible member having a portion thereof connected to said support means and extending from said portion through a vibratory length terminating at a free end;
tension inducing means being deflectable by a fluid flow and being connected to said free end for extending said flexible member along a reference axis in a zero flow velocity condition, said flexible member being transversely vibratory in response to an impinging fluid flow;
vibration node-fixing means connected to said support means and arranged adjacent said flexible member and having at least one vibration node-fixing surface arranged in spaced relation to said portion of said flexible member and displaced from the reference axis to establish a vibration node decreasing said vibratory length of said flexible member when said member is deflected from said reference axis into touching engagement with said node-fixing surface by a fluid flow; and
vibration sensing means connected to said flexible member for sensing the frequency of vibration of said flexible member and providing an output signal indicative of the flow velocity.
2. Apparatus according to claim 1 wherein:
said sensing means includes a hydrophone connected to said flexible member.
3. Apparatus according to claim 2 wherein:
said hydrophone is connected to said free end, the weight thereof in the fluid being included in said tension inducing means.
4. Apparatus according to claim 2 wherein said tention inducing means includes:
a buoyant body connected to said free end.
5. Apparatus according to claim 4 wherein:
said hydrophone is mounted within said buoyant body.
6. Apparatus according to claim 1 wherein:
said tension inducing means includes a weight;
said support means has formed therewithin a cavity adjacent said node-fixing means;
said sensing means is mounted within said cavity; and
said flexible member extends from said sensing means and through the boundary of said cavity adjacent said node-fixing means.
7. Apparatus according to claim 6 wherein said support means includes:
diaphragm means fixed to the boundary of said cavity through which extends said flexible member; and
a damping fluid contained within said cavity externally of said sensing means.
8. Apparatus according to claim 6 wherein:
said sensing means includes a hydrophone;
said support means further includes spring means con- nected between said hydrophone and said support means.

9. Apparatus according to claim 1 wherein:
said support means includes formed therein and extending thereinto a variably diametered bore of circular cross-section whose boundary includes said vibration node-fixing surface.

10. Apparatus according to claim 9 wherein:
said support means includes formed therein and extending therethrough said variably diametered bore;
said flexible member extends through said bore; and
said support means further includes connected thereto first clamping means adjustably movable transversely of said bore for engaging said flexible member at a point adjacent said node-fixing means.

11. Apparatus according to claim 10 wherein:
said support means further includes connected thereto a second clamping means adjustably movable transversely of said bore for engaging said flexible member at a point displaced along said bore away from said first clamping means; and
said flexible member is crimped within said bore between said points of engagement by said first and second clamping means.

12. Apparatus according to claim 9 wherein:
said support means is formed to have its center of gravity positioned adjacent the surface thereof from which said bore extends thereinto.

13. Apparatus according to claim 1 wherein said node-fixing surface includes:
a plurality of node-fixing points each successive point being spaced longitudinally of a next preceding point and radially of said reference axis sufficient distances wherein the length of the flexible member extending from a given said point to said free end satisfies the equation:

$$L = nd\sqrt{T/m_c}/2S_t U_o$$

wherein $n$ is any integer, $d$ and $m_c$ are respectively the diameter and the mass per unit length of said flexible member, $S_t$ is the Strouhal number, $U_o$ is that particular fluid flow velocity which causes a deflection of said flexible member into touching engagement with said given point and $T$ is the tension applied to said flexible member by said tension inducing means at said particular fluid flow velocity.

14. Apparatus according to claim 13 wherein said integer in said equation equals one.

15. Apparatus according to claim 13 wherein said integer equals two.

16. Apparatus according to claim 1 wherein:
said vibration node-fixing means includes a plurality of node-fixing surfaces successively spaced at progressively increased distances both from said portion of said flexible member connected to said support means and from the reference axis to establish upon touching engagement by said flow deflected flexible member respective vibration nodes decreasing by respective amounts said vibratory length of said flexible member.

17. Apparatus according to claim 16 wherein said node-fixing means includes:
a plurality of spaced apart rods fixed to and extending from said support means;
a plurality of rings successively having progressively greater inner diameters, each said ring being fixed to said plurality of rods along its outer periphery and each being mounted coaxially of said reference axis in spaced relation to the other said rings, the inner peripheries of said rings forming node-fixing surfaces.

18. Apparatus according to claim 17 wherein said support means includes:
an annular weight formed for encircling and being fixed to the extended ends of said rods.

19. Apparatus according to claim 16 wherein said support means includes:
a connector member;
a trough-like vibration node-fixing member, a lateral surface thereof comprising said vibration node-fixing surfaces, said node-fixing member being connected rotatably to said connector member; and
a vane having a lateral edge connected to the obverse lateral surface of said vibration node-fixing member.

References Cited

UNITED STATES PATENTS

| | | |
|---|---|---|
| 2,492,371 | 12/1949 | Sivian. |
| 2,869,366 | 1/1959 | Nitikman. |
| 3,144,767 | 8/1964 | Testerman et. al. |
| 3,273,389 | 9/1966 | Waugh. |

FOREIGN PATENTS

| | | |
|---|---|---|
| 71,944 | 10/1959 | France. |
| 197,897 | 5/1923 | Great Britain. |

RICHARD C. QUEISSER, *Primary Examiner.*

EDWARD D. GILHOOLY, *Assistant Examiner.*

U.S. Cl. X.R.

73—170, 228